(12) United States Patent
Sitaram et al.

(10) Patent No.: US 10,194,344 B1
(45) Date of Patent: Jan. 29, 2019

(54) DYNAMICALLY CONTROLLING BEARER QUALITY-OF-SERVICE CONFIGURATION

(71) Applicant: Sprint Spectrum L.P., Overland Park, KS (US)

(72) Inventors: Krishna Sitaram, Chantilly, VA (US); Hemanth B. Pawar, Brambleton, VA (US); Shilpa Kowdley Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 12 days.

(21) Appl. No.: 15/656,323

(22) Filed: Jul. 21, 2017

(51) Int. Cl.
*H04W 28/02* (2009.01)
*H04L 29/06* (2006.01)

(52) U.S. Cl.
CPC ..... *H04W 28/0205* (2013.01); *H04L 65/1016* (2013.01); *H04L 65/80* (2013.01); *H04W 28/0257* (2013.01); *H04W 28/0236* (2013.01); *H04W 28/0268* (2013.01)

(58) Field of Classification Search
CPC .... H04W 28/00–28/0289; H04L 65/80; H04L 65/1016; H04L 45/00; H04L 43/08; H04L 67/18; H04N 21/2402; H04N 21/44209
See application file for complete search history.

(56) References Cited

U.S. PATENT DOCUMENTS 9,642,159 B1* 5/2017 Ramamurthy .... H04W 72/1289
9,660,706 B1* 5/2017 Oroskar ............. H04L 5/0001
9,986,584 B1* 5/2018 Zhou ................. H04W 72/1289
2012/0202491 A1* 8/2012 Fox .................... H04B 7/2609
455/435.1
2013/0290493 A1* 10/2013 Oyman ................. H04W 4/70
709/219

(Continued)

FOREIGN PATENT DOCUMENTS

WO 2016059063 A1 4/2016

OTHER PUBLICATIONS

Barakovic et al., "Prioritizing Signaling Information Transmission in Next Generation Networks", Journal of Computer Networks and Communications, vol. 2011, Article ID 470264, 11 pages.

(Continued)

*Primary Examiner* — Afsar M Qureshi (57) ABSTRACT

Disclosed herein are methods and systems for dynamically controlling bearer quality-of-service (QoS) configuration. In an example arrangement, a wireless communication device (WCD) may have a first bearer and a second bearer with a base station, where the first bearer has a first set of one or more QoS parameters defining a first priority level for the base station scheduling communications on the first bearer, and the second bearer has a second set of one or more QoS parameters defining a second priority level for the base station scheduling communications on the second bearer, the second priority level being different from the first priority level. In this arrangement, an example method may involve detecting that the base station is threshold highly loaded, and responsive to the detecting, reconfiguring the second bearer to have the same QoS parameters as the first set of one or more QoS parameters.

20 Claims, 4 Drawing Sheets

(56) References Cited

U.S. PATENT DOCUMENTS

| | | | |
|---|---|---|---|
| 2016/0262044 A1* | 9/2016 | Calin | H04W 28/0268 |
| 2016/0278096 A1 | 9/2016 | Watfa et al. | |
| 2017/0238275 A1* | 8/2017 | De Pasquale | H04W 52/0238 |
| | | | 370/252 |
| 2017/0245311 A1* | 8/2017 | Murray | H04W 12/02 |
| 2017/0353115 A1* | 12/2017 | Kim | H02M 3/33523 |

OTHER PUBLICATIONS

H. Schulzrinne, "Requirements for Resource Priority Mechanisms for the Session Initiation Protocol (SIP)", Network Norking Group Request for Comments: 3487, Feb. 2003.

Barakovic et al., "Priority Transmission of SIP Signaling Flows in Case of IP Link Congestion", IEEE Xplore Digital Library, Jul. 2009, Abstract.

* cited by examiner

DYNAMICALLY CONTROLLING BEARER QUALITY-OF-SERVICE CONFIGURATION

BACKGROUND

A cellular wireless network may include a number of base stations that each radiate to provide coverage in which to serve wireless communication devices (WCDs) such as cell phones, tablet computers, tracking devices, embedded wireless modules, and other wireless equipped communication devices. In turn, each base station may sit as a node on a core access network that includes entities such as a network controller and a gateway system that provides connectivity with an external transport network such as the Internet. With this arrangement, a WCD within coverage of the network may engage in air interface communication with a base station and may thereby communicate via the base station with various remote network entities or with other WCDs.

In an example arrangement, the gateway system may include one or more packet data network gateways (PGWs) or similar components that provide connectivity with a packet-switched network so as to support general packet-data communications, such as general web browsing, file transfer, and the like, and/or packet-based real-time media communications such as voice over Internet Protocol (VoIP) and streaming media for instance.

A representative PGW may sit as a node on a wireless service provider's private packet-switched network and may thus provide connectivity with various application servers and other entities on that private network, and with other such entities accessible through a connection between the service provider's network and one or more other networks such as the public Internet. By way of example, such a PGW may provide connectivity with an Internet Multimedia Subsystem (IMS) platform or other session server that supports VoIP calling and/or other such media services.

When a WCD first enters into the coverage of a cellular wireless network, the WCD engages in a process of registering or "attaching" with the network, which may trigger setup of various communication channels for the WCD and/or reservation of various communication resources for the WCD. For instance, upon first detecting coverage of a base station, the WCD may transmit an attach request message to the base station, which the base station may forward to the network controller, such as a mobility management entity (MME). Upon authenticating and authorizing the WCD, the network controller may then engage in further signaling with the base station and with a serving gateway (SGW), which may in turn engage in signaling with a PGW, ultimately resulting in setup of one or more bearer connections or "bearers" each extending, via the base station, between the WCD and the PGW, through which the WCD can then engage in packet-data communication via the PGW. In addition, the base station may maintain a context record indicting the bearers(s) currently established for the WCD.

Each bearer established for a WCD may define a logical communication tunnel that includes a radio bearer portion extending between the WCD and the base station, and an access bearer portion extending between the base station and the PGW via the SGW. Further, each bearer may have a quality of service (QoS) level that defines for the bearer one or more QoS parameters that dictate how the packet data transmission along the bearer is handled by the network. For instance, from the base station's perspective, the QoS parameters may establish for the bearer a priority level according to which the base station should schedule air interface communication of data on the bearer. Such QoS parameters may include, for example, a packet delay budget (i.e., a maximum tolerated time that a packet may be delayed between the WCD and the PGW), a maximum tolerated rate of packet loss (also known as "error tolerance"), and/or a minimum tolerated bit rate.

Further, a bearer's QoS level may be represented in practice by a QoS class identifier (QCI) value. For example, LTE defines QCI values 1 through 9, with QCI values 1-4 providing for guaranteed bit rate (GBR) communications, and with QCI values 5-9 providing for best-efforts (non-GBR) communications. The QCI value of a bearer may also associate the bearer with a particular type of communication. For example, in LTE, a QCI 1 bearer is associated specifically with VoIP-call communication, and a QCI 9 bearer is associated specifically with general Internet traffic such as e-mail, chat, file transfer, and the like.

Each QCI level may thus correspond with data communication that has a particular priority level and particular QoS parameters. For example, a QCI 1 bearer may be for highest-priority data communications and could have a relatively low packet delay budget, a relatively low error tolerance, and/or a relatively high minimum bit rate. Further, a QCI 5 bearer may be for mid-level-priority data communications and could have a mid-range packet delay budget, a mid-range error tolerance, and/or a mid-range minimum bit rate. And a QCI 9 bearer may be for lowest-priority data communications and could have a relatively high packet delay budget, a relatively high error tolerance, and/or a relatively low minimum bit rate.

In practice, the network may establish for a WCD multiple bearers, each having different QoS levels and different QoS parameters. In particular, the network may initially establish for a WCD one or more default bearers to enable the WCD to engage in certain basic communications. By way of example, the network may initially establish for the WCD a default mid-level-QoS IMS signaling bearer (e.g., a QCI 5 bearer), which the WCD could use to engage in Session Initiation Protocol (SIP) signaling with the IMS to facilitate setup of a packet-based real-time media session, such as a Voice over LTE (VoLTE) call. Then, when the WCD engages in SIP signaling over the default IMS signaling bearer, the network may set up for the WCD a dedicated high-QoS IMS bearer (e.g., a QCI 1 bearer) for carrying VoLTE call traffic (namely, packets carrying digitized speech to or from the WCD in a voice call). Thereafter, while the WCD is engaged in the VoLTE call, additional SIP signaling for supporting the VoLTE call may be carried on the default IMS signaling bearer.

OVERVIEW

Unfortunately, there may be various scenarios where a WCD having multiple bearers with different QoS levels and parameters could pose an issue.

An example of such a scenario is when the base station's air interface becomes threshold highly loaded, which may occur when the base station's air interface resources are in threshold high use (e.g., when the base station is serving a threshold high number of WCDs). To illustrate why this scenario may pose an issue, consider for instance the above-described WCD, having two bearers that are related to the same VoLTE call, namely, a default IMS signaling bearer having mid-level priority (QCI 5) and a dedicated IMS bearer having high-level priority (QCI 1). If the air interface is threshold highly loaded, the base station may prioritize communications on higher-priority bearers such as the dedicated IMS bearer, and thus it may be more difficult for the base station to get signaling through to the WCD on the default IMS signaling bearer.

It may be useful in this scenario and others to change one or more QoS parameters of one of the WCD's bearers to be the same as a corresponding one or more QoS parameters of another of the WCD's bearers, in order to help equalize base station treatment of communications on the bearers in at least one respect. For example, for the WCD discussed above, the packet delay budget of the IMS signaling bearer could be lowered to be the same as that of the dedicated IMS bearer, and/or the error tolerance of the IMS signaling bearer could be lowered to be the same as that of the dedicated IMS bearer, and the base station would then apply those changes. This may, in effect, cause the base station to schedule communications on the IMS signaling with higher priority, possibly with the same priority as the dedicated IMS bearer.

Disclosed herein are methods and systems for dynamically controlling bearer QoS configuration along these lines, particularly in an arrangement in which a WCD has a first and second bearer, each having a respective set of QoS parameters that defines for the bearer a respective priority level, different than the priority level of the other bearer. In accordance with the disclosure, a network entity, such as a base station or a network controller, may detect that a level of load on the base station's air interface is threshold high. Then, in response to detecting the threshold high load, and based on a first set of QoS parameters of the first bearer, the network entity may reconfigure the second bearer to have the same QoS parameters as the first set of QoS parameters. And as a result, the base station may schedule communications on the second bearer in accordance with the first set of QoS parameters.

As described herein, a "set" of QoS parameters of a given bearer may include one or more of the QoS parameters of that bearer. For instance, given a bearer having a respective packet delay budget, error tolerance, and minimum tolerated bit rate, the act of changing a set of one or more QoS parameters of the bearer may involve changing only the packet delay budget, changing both the packet delay budget and the error tolerance, or changing all three QoS parameters, among other possibilities.

There may be other reasons to change QoS parameters as well, in addition to those discussed above. Furthermore, it may be desirable in other scenarios to equalize treatment of two bearers in other ways. For example, a packet delay budget of a first bearer could be raised to equal the packet delay budget of a second bearer, which could, in effect, lower the priority level of the first bearer. Other examples are possible as well.

Accordingly, in one respect, disclosed is a method for configuring communication between a base station and a WCD. The base station may serve the WCD over an air interface, and may be configured to schedule air interface communications between the base station and the WCD. The WCD may have a first bearer with the base station via the air interface and a second bearer with the base station via the air interface, where the first bearer has a first set of one or more QoS parameters defining a first priority level for the base station scheduling communications on the first bearer, and where the second bearer has a second set of one or more QoS parameters defining a second priority level for the base station scheduling communications on the second bearer, the second priority level being different from the first priority level.

The method may involve detecting that the base station is threshold highly loaded, and, responsive to the detecting and based on the first set of one or more QoS parameters, reconfiguring the second bearer to have the same QoS parameters as the first set of one or more QoS parameters. In this way, the base station will schedule communications on the second bearer in accordance with the first set of one or more QoS parameters.

Further, in another respect, disclosed is a method for configuring communication between a base station and a WCD, where the base station serves the WCD as discussed above, where the WCD has a first and second bearer as discussed above, and where the second priority level is lower than the first priority level. The method may involve detecting that a level of load on the air interface is threshold high and, responsive to the detecting, (i) determining the first set of one or more QoS parameters of the first bearer and (ii) based on the determining, reconfiguring the second bearer to have the determined set of one or more QoS parameters. In this way, the base station will schedule communications on the second bearer in accordance with the determined set of one or more QoS parameters.

In some implementations of the disclosed methods, the network entity may change a bearer's QoS parameters without changing the bearer's QCI value. One reason to do this may be so that various network entities such as the base station, MME, and/or PGW, can use the QCI value to easily identify the bearer and thus the type of communications that are to be scheduled and/or routed on that bearer. Therefore, in accordance with the disclosure, the network entity may make the above-described changes to the bearer's QoS parameters, but may leave the QCI value of the bearer unchanged, and may perhaps additionally store in memory an indication that the QCI value is unchanged.

In another respect, disclosed herein is a base station arranged to configure communication between the base station and WCD. The base station may serve the WCD over an air interface and may be configured to schedule air interface communications between the base station and the WCD. Further, the WCD may have a bearer with the base station via the air interface, where the bearer has QCI value defining for the bearer a set of one or more QoS parameters that define a priority level for the base station scheduling communications on the bearer. The base station may include a wireless communication interface and a controller operable to manage communication via the wireless communication interface. The controller may include a processing unit, data storage, and program instructions stored in the data storage and executable by the processing unit to carry out operations.

The operations may include detecting that a level of load on the air interface is threshold high, and responsive to the detecting, reconfiguring the bearer, where the reconfiguring comprises changing the set of one or more QoS parameters of the bearer to define a different, higher priority level, but keeping the QCI value of the bearer unchanged. In this way, the base station will schedule communications on the bearer in accordance with the different, higher priority level.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
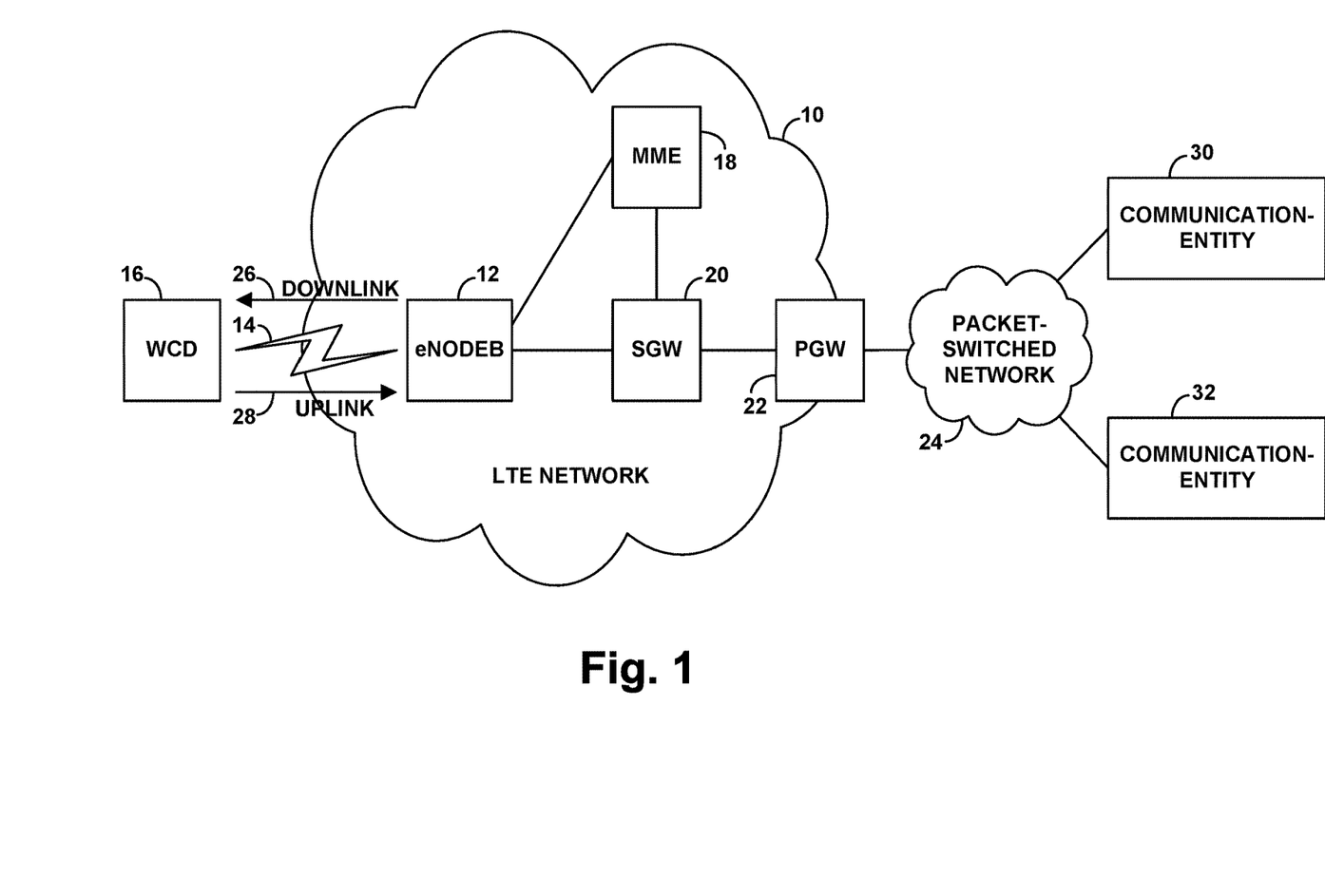
FIG. 1 is a simplified block diagram of an example network arrangement in which features of the present disclosure can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve WCDs with wireless packet data communication service, including possibly voice-over-packet service, but may also provide other functions. As shown, the LTE network includes a base station (eNodeB) 12, which has an antenna structure and associated equipment for providing an LTE coverage area 14 in which to serve WCDs such as an example WCD 16 as shown. The eNodeB 12 then has a communication interface with an MME 18 that functions as a signaling controller for the LTE network. Further, the eNodeB 12 has a communication interface with an SGW 20, which in turn has a communication interface with a PGW 22 that provides connectivity with a packet-switched network 24, and the MME has a communication interface with the SGW 20. In practice, these components of the LTE network could sit as nodes on a core packet-switched network, compliant with the industry standard system architecture evolution (SAE) for the LTE protocol, and thus the entities shown on the core network may each have an IP address and be configured to communicate with each other over packet-based tunnels or other communication interfaces.

With the arrangement of FIG. 1, the WCD may engage in communication with various remote communication-entities, such as servers or other end-user devices, on or via network 24. FIG. 1 depicts two such example entities, 30 and 32. These entities may take various forms and may be configured to communicate different types of content. By way of example, one entity may be voice-call server such as an IMS platform that provides voice-call services for WCDs such as WCD 16, and other entity may be a data server such as a web server, e-mail server, streaming video server, game server, or the like. Other examples are possible as well.

As illustrated, the air interface of coverage area 14 defines a downlink direction 26 from the eNodeB to the WCD and an uplink direction 28 from the WCD to the eNodeB. Further, the eNodeB and WCD may be configured (e.g., licensed and programmed) to support air interface communication on various particular carriers, which may be FDD or TDD. Each such carrier and/or its particular downlink and uplink channels may span a particular bandwidth (such as 1.4 MHz, 3 MHz, 5 MHz, 10 MHz, 15 MHz, or 20 MHz) and may be identified by one or more globally unique identifiers per industry standard, so that the eNodeB and a served WCD can refer to particular carriers by those identifiers.

According to LTE, each carrier's downlink channel may then define various sub-channels, such as a physical downlink control channel (PDCCH) for carrying scheduling directives and other control signaling from the eNodeB to WCDs, a physical downlink shared channel (PDSCH) for carrying scheduled downlink data communication, and a reference channel for carrying a reference signal that WCDs can monitor to evaluate coverage quality. Likewise, each carrier's uplink channel may define various sub-channels, such as a physical uplink control channel (PUCCH) for carrying scheduling requests and other control signaling from the WCDs to the eNodeB and a physical uplink shared channel (PUSCH) for carrying scheduled uplink data communication.

With this arrangement, when WCD 16 enters into coverage of eNodeB 12, the WCD may detect the eNodeB's coverage on a particular carrier, and the WCD and eNodeB may engage in an attach process or handover process to register with the LTE network on that carrier. For instance, the WCD may initially transmit an access request message on the carrier to the eNodeB, and the WCD and eNodeB may then engage in signaling in accordance with the Radio Resource Control (RRC) protocol to establish an RRC connection defining an air interface connection on which the WCD and eNodeB can engage in further communication. In turn, the WCD may then transmit to the eNodeB via the RRC connection an attach request seeking to register with the LTE network and be served by the eNodeB, and the eNodeB may pass the attach request along to the MME for processing.

After authenticating the WCD, the MME may then engage in signaling with the eNodeB and SGW to establish for the WCD, in accordance with the WCD's capabilities or the WCD's service profile, one or more bearers, each defining logical tunnels for carrying data between the WCD and the PGW. For instance, if the WCD's service profile indicates that the WCD supports general packet-data communication (such as web browsing, file transfer, and the like), the network may establish for the WCD a bearer for carrying such communications. Further, if the WCD's service profile indicates that the WCD supports VoIP communications or other such real-time packet-based communication service, the network may establish for the WCD a bearer to support SIP signaling or the like to facilitate setup of such communications. Each such bearer may include a radio bearer portion over the air between the WCD and the eNodeB, and a service bearer or access bearer portion between the eNodeB and the PGW via the SGW.

The eNodeB may then manage communication of packet data to and from the WCD over the air interface. For instance, as the eNodeB receives packet data from the network infrastructure for transmission to the WCD on the various bearers, the eNodeB may store the packets in one or more logical queues awaiting transmission on the air interface. For instance, the eNodeB may maintain a separate queue for each of the WCD's bearers, and these bearer-specific queues may then feed into an air interface scheduling queue from which the eNodeB transmits to the WCD the packets as modulated data on the air interface.

As discussed above, each bearer established for a WCD may have a corresponding QoS level that defines for the bearer one or more QoS parameters that dictate how the packet data transmission along the bearer is handled by the various entities of the network. To facilitate such handling of data transmission along the bearer, the MME may at some point during and/or after the attachment process establish in data storage a context record for the WCD, keyed to a WCD identifier, and may store in the context record indications of the QoS level and the corresponding QoS parameter(s) for the bearer. Further, other entities along the bearer path, such as the eNodeB, SGW, and PGW, may each access this context record (or store and maintain their own such context records) in order to determine how to handle data transmission along the bearer.

As noted above, examples of QoS parameters may include a packet delay budget, a maximum error tolerance, and/or a minimum tolerated bit rate. These QoS parameters may establish for the bearer a priority level according to which the eNodeB (and other entities, such as the MME and the PGW) should schedule/route data on the bearer. For example, in practice, a bearer with high-level QoS typically has high scheduling priority established by a low packet delay budget, a low error tolerance, and/or a high minimum bit rate. Further, a bearer with mid-level QoS typically has mid-level scheduling priority established by a mid-range packet delay budget, a mid-range error tolerance, and/or a mid-range minimum bit rate. And a bearer with low-level QoS typically has low scheduling priority established by a high packet delay budget, a high error tolerance, and/or a low minimum bit rate.

As further discussed above, a bearer's QoS level may be represented in practice by a QCI value. For example, a QCI 1 bearer is a GBR bearer having high-level QoS and is associated specifically with VoIP-call communication, a QCI 4 bearer is a GBR bearer having mid-level QoS and is associated specifically with non-conversational video streaming, a QCI 5 bearer is a best-efforts bearer having mid-level QoS and is associated specifically with packet-based signaling for setup of packet-based real-time media communications such as VoIP calls for instance, and a QCI 9 bearer is a best-efforts bearer having low-level QoS and is associated specifically with general Internet traffic such as e-mail, chat, file transfer, and the like.

In line with the discussion above, at the time of initial attachment, the MME may establish for a WCD a QCI 9 bearer or other general Internet bearer, to enable the WCD to engage in general data communication. Further, the MME may establish one or more additional bearers for the WCD based on WCD capabilities or service-profile information. For instance, if the WCD is configured to support VoLTE call communication, then the MME may also establish for the WCD a QCI 5 bearer through which the WCD can engage in VoLTE call setup signaling, such as SIP signaling, with the IMS to facilitate setup (e.g., placement or reception) of a voice call. Further, the MME may store the QCI value and QoS parameters for each bearer in the context record for the WCD.

Further, while the eNodeB is serving the WCD, the MME may add one or more bearers from the WCD's service. For example, if the WCD engages in SIP signaling with an IMS to set up a VoLTE call, control signaling may pass from the IMS to the PGW to the SGW and to the MME, triggering the MME to establish for the WCD a QCI 1 bearer for carrying VoLTE call traffic, and the WCD's VoLTE call traffic would then flow via that QCI 1 bearer. Thereafter, while the WCD is engaged in the VoLTE call, additional SIP signaling for supporting the VoLTE call could be carried on the QCI 5 bearer. In addition, as noted above, the MME, eNodeB, and/or other network entity may store, in the context record(s) maintained for the WCD, indications of the QCI value and the QoS parameters for each bearer established for the WCD.

Unfortunately, as noted above, there may be some instances where it may be problematic for the WCD to have multiple different bearers that are related to the same media session (e.g., a VoLTE call). By way of example, this could be problematic when the eNodeB's air interface is threshold highly loaded.

In practice, an eNodeB may have limited air interface resources available for use in serving WCDs. For instance, the various air interface control and traffic channels defined in the eNodeB's coverage area could have limited capacity, such as a limited quantity of time and/or frequency resources, and/or the eNodeB might be limited to serving up to a maximum quantity of WCDs at a time. Consequently, in operation, a eNodeB's air interface may have a varying level of load, which could be defined in terms of an extent to which the eNodeB's limited air interface resources in use, possibly measured over a recent sliding window of time or the like. For instance, the level of load on the eNodeB's air interface could be based on a level of air interface resource utilization and/or a number of served WCDs. Other examples are possible as well.

Further, in operation, the eNodeB may regularly monitor the level of load on the eNodeB's air interface in various ways. For example, the eNodeB could regularly monitor how many WCDs it is serving, such as how many WCDs have an RRC connection with the eNodeB, perhaps as a percentage of an allowed maximum number of concurrently served WCDs. As another example, the eNodeB could regularly monitor its air interface resource utilization, such as what percentage of control region resource elements and/or shared channel resource elements have been used on average over a recent sliding window of time. Other network entities (e.g., the MME) could monitor load on the eNodeB's air interface in similar manners, or the eNodeB could provide reports of its load to such other entities at various times, such as when the eNodeB detects threshold high air interface load.

As noted above, when the eNodeB's air interface becomes threshold highly loaded, signaling on lower-priority bearers may be delayed or prevented from getting through to the WCD, as communications on higher-QoS bearers might be prioritized over such signaling.

In accordance with the present disclosure, the network (e.g., the eNodeB or the MME) could engage in a process to help address this problem. Namely, when the network detects that the eNodeB's air interface is threshold heavily loaded (e.g., that one or more of the above noted load metrics is at least as high as a predefined threshold level), the network could initiate a process to change a set of QoS parameters of the WCD's lower-priority bearer to be the same as a corresponding set of QoS parameters of the WCD's higher-priority bearer.

By way of example, given a WCD with a QCI 1 bearer for VoLTE call traffic and a QCI 5 bearer for VoLTE-related SIP signaling, the eNodeB may determine a set of QoS parameters of the QCI 1 bearer (e.g., the packet delay budget and/or error tolerance), such as by referring to the context record for that bearer. The eNodeB may then use the determined set of QoS parameters of the QCI 1 bearer to reconfigure the QCI 5 bearer to have the same set of QoS parameters. As a result, the eNodeB may schedule communications on the QCI 5 bearer in accordance with the same set of QoS parameters as on the QCI 1 bearer, e.g., with a low packet delay budget and/or low error tolerance, and thus with higher priority than a typical QCI 5 bearer.

In practice, the act of reconfiguring the QCI 5 bearer to have the same set of QoS parameters as the QCI 1 bearer may at least in part involve changing the stored context record of the WCD to indicate that the QCI 5 bearer has the same set of QoS parameters as the QCI 1 bearer. As such, each of the entities along the QCI 5 bearer path may have access to the changed context record and may schedule/route communications on the QCI 5 bearer accordingly.

In an example implementation of the disclosed process, the network may reconfigure the WCD's lower-priority bearer to have the same QoS parameters as the WCD's higher-priority bearer may occur, but may keep the QCI value of the lower-priority bearer unchanged, such as by making no change to the indication of the bearer's QCI value stored in the WCD's context record. For example, during or after reconfiguration of the bearer, the network may store in the context record for the WCD a specific indication of the changes made to the bearer's QoS parameters (e.g., an indication of the new, lower packet delay budget). Alternatively, the network may set a flag, in the context record or elsewhere in data storage, that indicates with less specificity that the bearer's QoS parameters have been changed. In any event, the network may make no change to the stored indication of the bearer's QCI value in the WCD's context record. Other examples are possible as well.

In some implementations of the disclosed process, the network may predict that the eNodeB's air interface will become threshold highly loaded. And, in response to that prediction, but before the predicted threshold high load occurs, the eNodeB may proactively deal with possibly impending trouble getting signaling through on a lower-priority bearer, namely, by reconfiguring one of the WCD's bearers to have the same QoS parameters as another of the WCD's bearers, just in case the threshold high load does in fact occur.

The network may predict the threshold high load in various ways. For example, the eNodeB or other entity could evaluate one or more downlink packet queues or other information to detect a trend or other indication that air interface load is approaching a threshold high level. Additionally or alternatively, the eNodeB or other entity could evaluate how long downlink packets have been queued for transmission on the air interface, and the eNodeB station may thus regularly maintain metrics indicating the extent to which packets are being queued for too long. As such, the eNodeB may be configured to detect a statistical high extent (e.g., threshold high rate) of such excess packet delay and to deem that high extent to indicate that load is so high that the eNodeB should reconfigure one of the WCD's bearers as discussed above. Other examples are possible as well.

Furthermore, in another example implementation of the disclosed process, the eNodeB may at some point transmit or otherwise provide to the WCD an indication that the reconfigured bearer's QoS parameters have been changed. For example, the eNodeB may transmit such an indication to the WCD in an RRC connection reconfiguration message. As another example, the eNodeB or other entity could indicate the reconfigured bearer's QoS parameters in the context record for the WCD and then provide the context record to the WCD. Further, the eNodeB may transmit or otherwise provide to the WCD an indication that the bearer's QCI value is unchanged. For example, the MME, eNodeB, or other network entity could tag to-be-transmitted packets with the unchanged QCI value, or could leave the QCI value unchanged in the context record for the WCD. Other examples are possible as well.

Moreover, a variation of the disclosed process could apply in a scenario in which a set of QoS parameters of a bearer is changed without taking into account the QoS parameters of another bearer. For example, consider a scenario in which the WCD has a QCI 5 IMS signaling bearer established, but the presence of threshold high load on the air interface is delaying the SIP signaling on the IMS signaling bearer from getting through, and thus a QCI 1 dedicated IMS bearer cannot be timely established for the WCD. In this and other scenarios, it may be useful to change one or more QoS parameters of the WCD's QCI 5 bearer so as to increase the priority level at which communications will be scheduled on that bearer. This could be accomplished, for instance, by lowering the packet delay budget of the bearer and/or by lowering the error tolerance of the bearer, in line with the discussion above.

Accordingly, a variation of the disclosed process may involve the network detecting that a level of load on the eNodeB's air interface is threshold high, and then, in response to detecting the threshold high load, the network changing a set of QoS parameters of the WCD's bearer to increase the priority level at which communications will be scheduled on that bearer. Further, in line with the discussion above, this change may occur without the network changing the QCI value of the bearer. Other variations of the disclosed process are possible as well.

Figure 2:
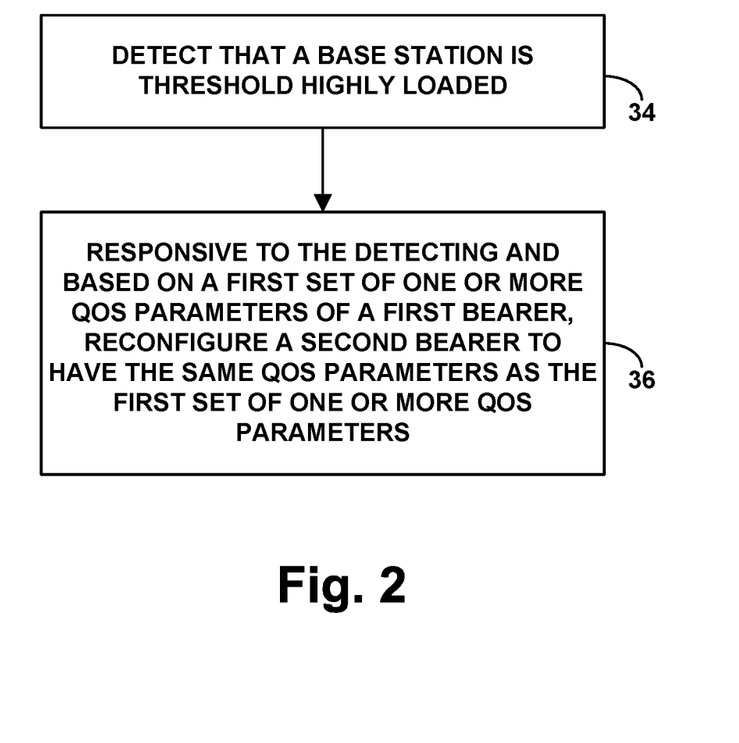
FIG. 2 is a flow chart depicting functions that can be carried out in accordance with the present disclosure.

FIG. 2 is next a flow chart depicting functions that can be carried out by a network entity such as a base station (e.g., eNodeB 12) or an MME (e.g., MME 18) in accordance with the present disclosure. In line with the discussion above, the base station may serve a WCD over an air interface and may be configured to schedule air interface communications between the base station and the WCD. Further, the WCD may have a first bearer with the base station via the air interface and a second bearer with the base station via the air interface. The first bearer may have a first set of one or more QoS parameters defining a first priority level for the base station scheduling communications on the first bearer, and the second bearer may have a second set of one or more QoS parameters defining a second, different priority level (e.g., a higher priority level) for the base station scheduling communications on the second bearer, the second priority level being different from the first priority level.

As shown in FIG. 2, at block 34, the network entity detects that the base station is threshold highly loaded. And at block 36, responsive to the detecting and based on the first set of one or more QoS parameters, the network entity reconfigures the second bearer to have the same QoS parameters as the first set of one or more QoS parameters. In this way, the base station will schedule communications on the second bearer in accordance with the first set of one or more QoS parameters.

Various other features described above could be incorporated into this method as well. For example, the network entity may reconfigure the second bearer but leave the QCI value of the bearer unchanged. As another example, the act of detecting that a level of load on the air interface is threshold high may involve the network entity predicting that the level of load will be threshold high, after which the network entity may proactively reconfigure the second bearer in the manner discussed above.

Figure 3:
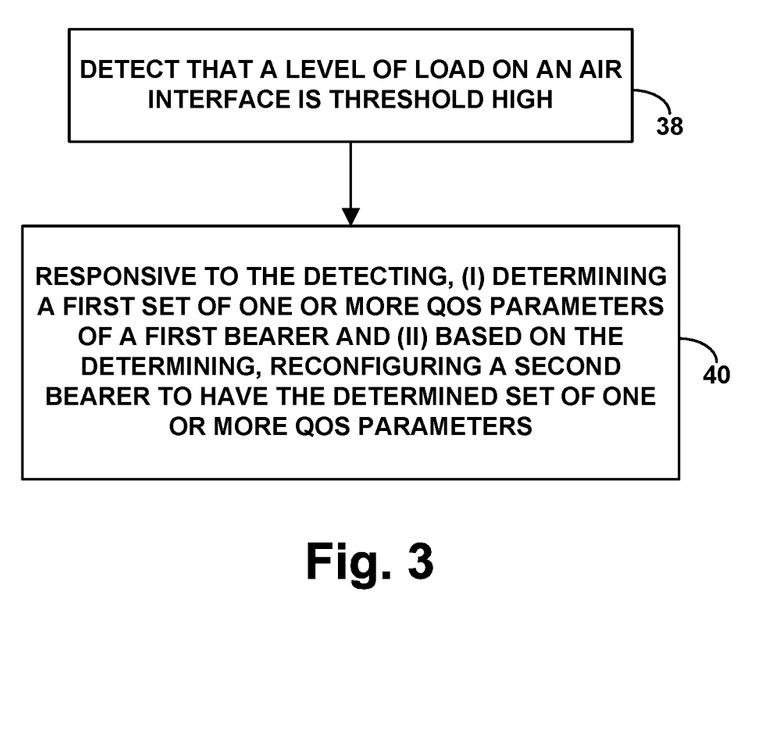
FIG. 3 is another flow chart depicting functions that can be carried out in accordance with the present disclosure.

FIG. 3 is next another flow chart depicting functions that can be carried out by the network entity noted above in accordance with the present disclosure. In line with the discussion above, the base station may be configured as noted above with regard to FIG. 2, and the WCD may have two different bearers as noted above. As shown in FIG. 3, at block 38, the network entity detects that a level of load on the air interface is threshold high. And at block 40, responsive to the detecting, the network entity (i) determines the first set of one or more QoS parameters of the first bearer and (ii) based on the determining, reconfigures the second bearer to have the determined set of one or more QoS parameters. In this way, the base station will schedule communications on the second bearer in accordance with the determined set of one or more QoS parameters.

Moreover, it should be noted that the network may be configured to reconfigure the second bearer in the manners discussed above in response to detecting other types of threshold high load with regard to the base station. For instance, in operation, the base station's backhaul connection with the core network may have limited capacity (e.g., in terms of supportable data rate or the like), and the base station may have limited processing resources. As such, if the network determines that the level of backhaul utilization (backhaul load) is threshold high and/or the level of processing load is threshold high, the network may reconfigure the second bearer in the manner discussed above. To facilitate this, for example, the base station or other network entity could regularly monitor the base station's backhaul utilization, such as how much data the base station has communicated to and/or from the core network on average over a recent sliding window. And as another example, the base station or other network entity could regularly monitor the base station's processing load, such as how many central processing unit (CPU) cycles the base station has used on average over a recent sliding window.

Figure 4:
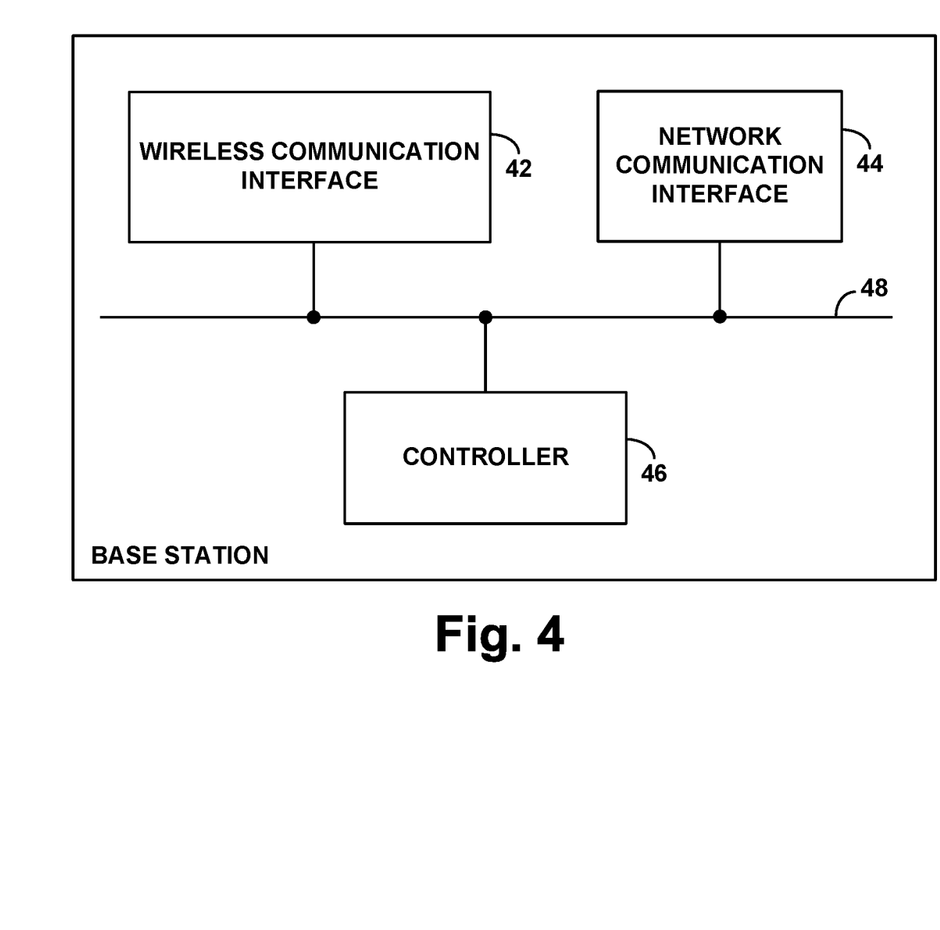
FIG. 4 is a simplified block diagram of an example base station, depicting components that can be included in such an entity to facilitate carrying out operations of the present disclosure.

Finally, FIG. 4 is a simplified block diagram of an example base station, showing some of the components that such a base station may include in order to carry out operations such as those discussed above. As shown, the example base station includes a wireless communication interface 42, a network communication interface 44, and a controller 46, all of which could be integrated together in various ways or, as shown, interconnected with each other through a system bus, network, or other connection mechanism 48.

Wireless communication interface 42 could include an antenna structure (e.g., one or more antennas or antenna elements), which could be tower mounted or provided in some other manner, configured to transmit and receive over the air interface and thereby facilitate communication with served WCDs. Further, the wireless communication interface could include a transceiver and power amplifier supporting air interface communication according to an applicable air interface protocol. Network communication interface 44 may then comprise one or more wired and/or wireless network interfaces (such as an Ethernet interface) through which the base station may communicate with various other core network entities such as an SGW, MME, and the like.

Controller 46, which may be integrated with wireless communication interface 42, with network communication interface 44, and/or with one or more other components of the base station, may then be configured to manage service of a WCD as discussed above. By way of example, controller 46 may be configured to (i) detect that a level of load on the air interface is threshold high, and (ii) responsive to the detecting, reconfigure the bearer by changing the set of one or more QoS parameters of the bearer to define a different, higher priority level, but keeping the QCI value of the bearer unchanged, whereby the base station will schedule communications on the bearer in accordance with the different, higher priority level.

Controller 46 could be implemented using hardware, software, and/or firmware. For example, controller 46 could include one or more processors and a non-transitory computer readable medium (e.g., volatile and/or non-volatile memory) that stores machine language instructions or other executable instructions. The instructions, when executed by the one or more processors, may cause controller 46, and thus the base station, to carry out the various base station operations described herein.

Exemplary embodiments have been described above. It should be understood, however, that variations from these embodiments are possible, while remaining within the scope of the invention.

What is claimed is:

1. A method for configuring communication between a base station and a wireless communication device (WCD), wherein the base station serves the WCD over an air interface, wherein the base station is configured to schedule air interface communications between the base station and the WCD, wherein the WCD has a first bearer with the base station via the air interface and a second bearer with the base station via the air interface, wherein the first bearer has a first set of one or more quality of service (QoS) parameters defining a first priority level for the base station scheduling communications on the first bearer, and wherein the second bearer has a second set of one or more QoS parameters defining a second priority level for the base station scheduling communications on the second bearer, the second priority level being different from the first priority level, the method comprising:
   detecting that the base station is threshold highly loaded; and
   responsive to the detecting and based on the first set of one or more QoS parameters, reconfiguring the second bearer to have the same QoS parameters as the first set of one or more QoS parameters, whereby the base station will schedule communications on the second bearer in accordance with the first set of one or more QoS parameters.

2. The method of claim 1, performed by a network device, the network device being selected from the group consisting of: the base station and a mobility management entity (MME).

3. The method of claim 1, wherein the second priority level is lower than the first priority level.

4. The method of claim 1, wherein the first and second sets of one or more QoS parameters each include at least one QoS parameter from the group consisting of: a respective packet delay budget, a respective maximum rate of packet loss, and a respective minimum bit rate.

5. The method of claim 1,
   wherein the first bearer has a first QoS class identifier (QCI) value and the second bearer has a second QCI value, and
   wherein reconfiguring the second bearer to have the same QoS parameters as the first set of one or more QoS parameters comprises reconfiguring the second bearer to have the same QoS parameters as the first set of one or more QoS parameters, but keeping the QCI value of the second bearer unchanged.

6. The method of claim 5, wherein the first QCI value is from a first set of QCI values corresponding to guaranteed bit rate (GBR) bearer communication and the second QCI value is from a second set of QCI values corresponding to best-effort (non-GBR) bearer communication, the first and second sets of QCI values being mutually exclusive.

7. The method of claim 1, wherein the first bearer is a Voice over Long Term Evolution (VoLTE) bearer and the second bearer is an Internet Multimedia Subsystem (IMS) signaling bearer.

8. The method of claim 1, wherein detecting that the base station is threshold highly loaded is based on a determination of one or more of: a level of air interface resource utilization, a quantity of WCDs served over the air interface, a level of backhaul utilization, and a level of processor load.

9. The method of claim 1, wherein detecting that the base station is threshold highly loaded comprises predicting that the level of load on the air interface will be threshold high.

10. The method of claim 9, wherein predicting that the level of load on the air interface will be threshold high is based on evaluation of downlink packet queuing at the base station.

11. The method of claim 9, wherein predicting that the level of load on the air interface will be threshold high is based on evaluation of how long downlink packets have been queued for transmission on the air interface.

12. The method of claim 1, further comprising:
further responsive to the detecting, transmitting, to the WCD, an indication that the second bearer has been reconfigured to have the determined set of one or more QoS parameters.

13. A method for configuring communication between a base station and a wireless communication device (WCD), wherein the base station serves the WCD over an air interface, wherein the base station is configured to schedule air interface communications between the base station and the WCD, wherein the WCD has a first bearer with the base station via the air interface and a second bearer with the base station via the air interface, wherein the first bearer has a first set of one or more quality of service (QoS) parameters defining a first priority level for the base station scheduling communications on the first bearer, and wherein the second bearer has a second set of one or more QoS parameters defining a second priority level for the base station scheduling communications on the second bearer, the second priority level being lower than the first priority level, the method comprising:
detecting that a level of load on the air interface is threshold high; and
responsive to the detecting, (i) determining the first set of one or more QoS parameters of the first bearer and (ii) based on the determining, reconfiguring the second bearer to have the determined set of one or more QoS parameters, whereby the base station will schedule communications on the second bearer in accordance with the determined set of one or more QoS parameters.

14. The method of claim 13, performed by a network device, the network device being selected from the group consisting of: the base station and a mobility management entity (MME).

15. The method of claim 13, wherein the first and second sets of one or more QoS parameters each include at least one QoS parameter from the group consisting of: a respective packet delay budget, a respective maximum rate of packet loss, and a respective minimum bit rate.

16. The method of claim 13,
wherein the first bearer has a first QoS class identifier (QCI) value and the second bearer has a second QCI value, and
wherein the first QCI value is from a first set of QCI values corresponding to guaranteed bit rate (GBR) bearer communication and the second QCI value is from a second set of QCI values corresponding to best-effort (non-GBR) bearer communication, the first and second sets of QCI values being mutually exclusive.

17. The method of claim 13, wherein detecting that the level of load on the air interface is threshold high is based on a determination of one or more of: a level of air interface resource utilization and a quantity of WCDs served over the air interface.

18. A base station arranged to configure communication between the base station and a wireless communication device (WCD), wherein the base station serves the WCD over an air interface, wherein the base station is configured to schedule air interface communications between the base station and the WCD, wherein the WCD has a bearer with the base station via the air interface, and wherein the bearer has a quality of service class identifier (QCI) value defining for the bearer a set of one or more quality of service (QoS) parameters that define a priority level for the base station scheduling communications on the bearer, the base station comprising:
a wireless communication interface; and
a controller operable to manage communication via the wireless communication interface, the controller including a processing unit, data storage, and program instructions stored in the data storage and executable by the processing unit to carry out operations comprising:
detecting that a level of load on the air interface is threshold high; and
responsive to the detecting, reconfiguring the bearer, wherein the reconfiguring comprises changing the set of one or more QoS parameters of the bearer to define a different, higher priority level, but keeping the QCI value of the bearer unchanged, whereby the base station will schedule communications on the bearer in accordance with the different, higher priority level.

19. The base station of claim 18, wherein set of one or more QoS parameters includes at least one QoS parameter from the group consisting of: a packet delay budget, a maximum rate of packet loss, and a minimum bit rate.

20. The base station of claim 18,
wherein detecting that the level of load on the air interface is threshold high comprises predicting that the level of load on the air interface will be threshold high, and
wherein predicting that the level of load on the air interface will be threshold high is based on one or more of: an evaluation of downlink packet queuing at the base station and an evaluation of how long downlink packets have been queued for transmission on the air interface.

* * * * *